United States Patent
VanderMeulen et al.

(10) Patent No.: US 12,500,661 B2
(45) Date of Patent: Dec. 16, 2025

(54) CO-LOCATED SATELLITES WITH GROUND BASED PROCESSING

(71) Applicant: Viasat Inc., Carlsbad, CA (US)

(72) Inventors: Richard VanderMeulen, Dove Canyon, CA (US); Craig A Miller, Carlsbad, CA (US); David J. Hancharik, Norcross, GA (US); Parker A Robinson, Ocala, FL (US)

(73) Assignee: Viasat, Inc., Carlsbad, CA (US)

( * ) Notice: Subject to any disclaimer, the term of this patent is extended or adjusted under 35 U.S.C. 154(b) by 350 days.

(21) Appl. No.: 18/030,478

(22) PCT Filed: Oct. 22, 2021

(86) PCT No.: PCT/US2021/056299
§ 371 (c)(1),
(2) Date: Apr. 5, 2023

(87) PCT Pub. No.: WO2022/087450
PCT Pub. Date: Apr. 28, 2022

(65) Prior Publication Data
US 2023/0370155 A1   Nov. 16, 2023

Related U.S. Application Data

(60) Provisional application No. 63/104,142, filed on Oct. 22, 2020.

(51) Int. Cl.
*H04B 7/185* (2006.01)

(52) U.S. Cl.
CPC ..... *H04B 7/18513* (2013.01); *H04B 7/18517* (2013.01)

(58) Field of Classification Search
CPC ............ H04B 7/18513; H04B 7/18502; H04B 7/185; H04B 7/1851; H04B 7/18515;
(Continued)

(56) References Cited

U.S. PATENT DOCUMENTS

| 6,125,261 A | 9/2000 | Anselmo et al. |
| 2012/0295538 A1* | 11/2012 | Arcidiacono ......... H04B 7/185 455/12.1 |

(Continued)

FOREIGN PATENT DOCUMENTS

| JP | H09162795 A | 6/1997 |
| JP | 2018528659 A | 9/2018 |

(Continued)

OTHER PUBLICATIONS

International Search Report and Written Opinion, PCT/US2021/056299 dated Feb. 24, 2022, 19 pages.

*Primary Examiner* — Keith Ferguson
(74) *Attorney, Agent, or Firm* — Holland & Hart LLP

(57) ABSTRACT

Methods, systems, and devices for co-located satellites with ground based processing are described. A set of co-located satellites may be configured to collect a set of return link signal components, where each co-located satellite includes a first payload configured to receive a respective return link signal component including one or more return link signal transmitted from one or more terminals and a second payload configured to transmit a representation of the respective return link signal component. One or more ground stations may be configured to receive the representations of the respective return link signal components. A central processor may be configured to apply a set of beamforming coefficients to the representations of the respective return link signal components received by the one or more ground stations to obtain one or more return link beam signals corresponding to one or more return link beams from the set of co-located satellites.

16 Claims, 10 Drawing Sheets

(58) Field of Classification Search
CPC ............ H04B 7/18517; H04B 7/18519; H04B 7/18528; H04B 7/1853
See application file for complete search history.

(56) References Cited

U.S. PATENT DOCUMENTS

| | | |
|---|---|---|
| 2015/0304019 A1 | 10/2015 | Shreve et al. |
| 2016/0094288 A1 | 3/2016 | Krebs |
| 2018/0376392 A1 | 12/2018 | Wu et al. |
| 2019/0372656 A1 | 12/2019 | Fang et al. |
| 2020/0313756 A1 | 10/2020 | Prinz |

FOREIGN PATENT DOCUMENTS

| | | |
|---|---|---|
| RU | 2487369 C2 | 7/2013 |
| RU | 2660559 C2 | 7/2018 |
| RU | 2727185 C2 | 7/2020 |
| WO | WO2017023621 A1 | 2/2017 |
| WO | 2018236981 A1 | 12/2018 |

\* cited by examiner

CO-LOCATED SATELLITES WITH GROUND BASED PROCESSING

CROSS REFERENCE

The present Application for Patent is a 371 national phase filing for International Patent Application No. PCT/US2021/056299 by VANDERMEULEN et al., entitled "CO-LOCATED SATELLITES WITH GROUND BASED PROCESSING" filed Oct. 22, 2021, which claims the benefit of U.S. Provisional Patent Application No. 63/104,142 by VANDERMEULEN et al., entitled "GEO SWARM WITH GROUND BASED PROCESSING," filed Oct. 22, 2020, each of which is assigned to the assignee hereof and expressly incorporated by reference herein in its entirety.

BACKGROUND

The following relates generally to communications, including co-located satellites with ground based processing.

Communications devices may communicate with one another using wired connections, wireless (e.g., radio frequency (RF)) connections, or both. Wireless communications between devices may be performed using wireless spectrum that has been designated for a service provider, wireless technology, or both. In some examples, the amount of information that can be communicated via a wireless communications network is based on an amount of wireless spectrum designated to the service provider, and an amount of frequency reuse within the region in which service is provided. Wireless communications (e.g., cellular communications, satellite communications, etc.) may use beamforming and multiple-input multiple-output (MIMO) techniques for communications between devices to increase frequency reuse, however, providing a high level of frequency reuse in some types of communication systems such as satellite communications presents challenges.

SUMMARY

A set of co-located satellites may be configured to collect a set of return link signal components, where at least two pairs of adjacent satellites of the set of co-located satellites along a first dimension have a different inter-satellite spacing, and where each satellite of the set of co-located satellites includes a first payload configured to receive a respective return link signal component including one or more return link signals transmitted from one or more terminals over a first frequency range and a second payload configured to transmit a representation of the respective return link signal component. One or more ground stations may be configured to receive the representations of the respective return link signal components. A central processor may be configured to apply a set of beamforming coefficients to the representations of the respective return link signal components received by the one or more ground stations to obtain one or more return link beam signals corresponding to one or more return link beams from the set of co-located satellites.

DETAILED DESCRIPTION

In some examples, co-located satellites of a satellite swarm (e.g., a geostationary Earth orbit (GEO) swarm) may communicate with a terminal. For instance, the terminal may transmit a signal, where a first signal component of the signal is received by a first satellite of the satellite swarm and a second signal component of the signal is received by a second satellite of the satellite swarm. Processing respective signal components to form a beam signal from the signal components may involve the first and second satellites consuming substantial energy. However, each satellite may have a limited supply or budget of energy to expend on processing. Additionally, malfunction of components used to process the respective signal components at the first and second satellites may be difficult or expensive, for example involving replacing a satellite or repairing a satellite in orbit. In some examples, capability of the satellite swarm may be impacted for a duration of time during which the first and/or second satellites may be incapable of processing the respective signal components.

Accordingly, in some examples, each of the first and second satellites may receive a respective signal component from the terminal via a first payload and may transmit a respective representation of the respective signal component to another device for processing. The other device may include one or more ground stations or may include a central satellite configured to aggregate the representations and transmit the aggregated representations to the one or more ground stations. The one or more ground stations may provide received representations of signal components to a central processor that is configured to apply a set of beamforming coefficients to the representations to obtain one or more beam signals corresponding to one or more beams from the satellite swarm. By processing the representations of the signal components at the central processor, the first and second satellites may conserve more energy. Additionally, since repair or replacement of processing components of a central processor may be simpler and faster, a duration of time during which the central processor may be incapable of processing representations of signal components due to component malfunction may be shorter than a duration of time during which the first and second satellites may be incapable of processing signal components due to component malfunction.

Features of the disclosure are initially described in the context of a satellite communications system and a communications network as described with reference to FIGS. 1 and 2. Features of the disclosure are described in the context of communications schemes as described with reference to FIGS. 3-7. These and other features of the disclosure are further illustrated by and described with reference to an apparatus diagram and flowcharts that relate to co-located satellites with ground based processing as described with reference to FIGS. 8-10.

Figure 1:
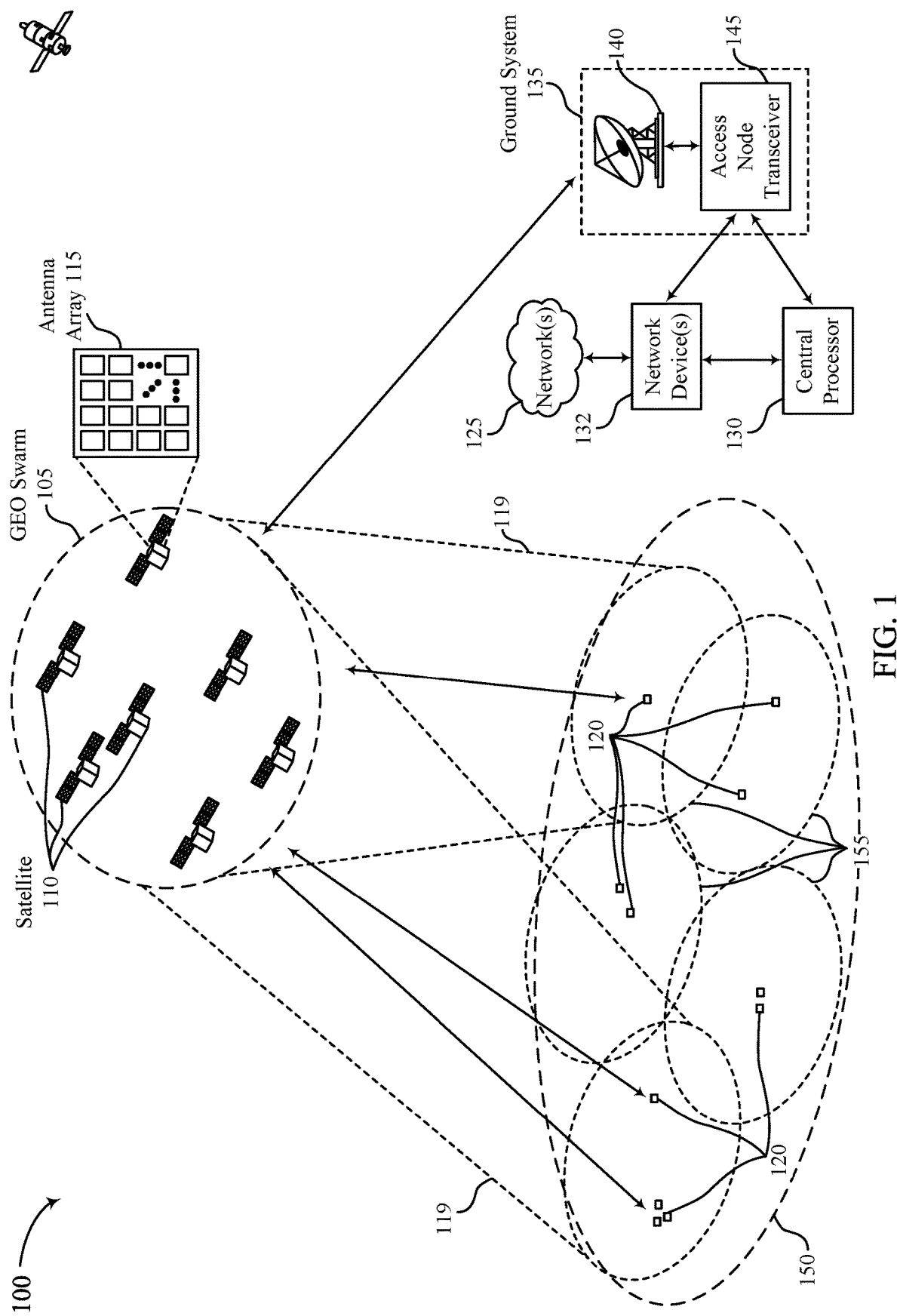
FIG. 1 illustrates an example of a satellite communications system that supports co-located satellites with ground based processing in accordance with aspects described herein.

FIG. 1 shows an example of a satellite communications system 100 that supports co-located satellites with ground based processing in accordance with aspects described herein. Satellite communications system 100 may include a ground system 135, terminals 120, and a satellite swarm 105. In some cases, satellite swarm may be in a geostationary Earth orbit (GEO). Although discussed with reference to the satellite swarm 105 including GEO satellites, in some examples the satellites of the satellite swarm 105 may be in other orbits such as a low Earth orbit (LEO) or medium Earth orbit (MEO). The ground system 135 may include a network of access nodes 140 that are configured to communicate with the satellite swarm 105. The access nodes 140 may be coupled with access node transceivers 145 that are configured to process signals received from and to be transmitted through corresponding access node(s) 140. The access node transceivers 145 may also be configured to interface with a network 125 (e.g., the Internet)—e.g., via a network device 132 (e.g., a network operations center, satellite and gateway terminal command centers) that may provide an interface for communicating with the network 125.

Terminals 120 may include various devices configured to communicate signals with the satellite swarm 105, where the terminals 120 may include fixed terminals (e.g., ground based stationary terminals) or mobile terminals such as terminals on boats, aircraft, ground based vehicles, and the like. A terminal 120 may communicate data and information with an access node 140 via the satellite swarm 105. The data and information may be communicated with a destination device such as a network device 132, or some other device or distributed server associated with network 125.

The satellite swarm 105 may include a network of satellites 110 that are deployed in space orbits (e.g., GEO, MEO, LEO, etc.). One or more satellites 110 included in the satellite swarm 105 may be equipped with an antenna array 115 that includes multiple antennas and/or antennas panels. The antennas, which may also be referred to as antenna elements, of each antenna array 115 may be evenly distributed or unevenly distributed. Additionally or alternatively, the one or more satellites 110 may be evenly distributed or unevenly distributed relative to each other. For example, the distribution of the satellites 110 may be non-harmonic, meaning that inter-satellite spacing is different across the satellite swarm 105, and in some the spacing between any two satellites 110 of the satellite swarm 105 may be different than the spacing between any other two satellites. In some cases, the spacing between the satellites may be allowed to vary (e.g., over time) based on differences in orbital positioning.

The satellite swarm 105 may use the one or more satellites 110 to support multiple-input multiple-output (MIMO) techniques to increase a utilization of frequency resources used for communications—e.g., by enabling wireless spectrum to be reused concurrently in different geographic regions of a geographic area. Similarly, the satellite swarm 105 may use the one or more satellites to support beamforming techniques to increase a utilization of frequency resources used for communications.

MIMO techniques may be used to exploit multipath signal propagation and increase spectral efficiency by transmitting or receiving multiple signals via different spatial layers. The multiple signals may, for example, be transmitted by a transmitting device (e.g., a satellite 110 or multiple satellites 110 of satellite swarm 105) via a set of antennas in accordance with a set of weighting coefficients. Likewise, the multiple signals may be received by a receiving device (e.g., a satellite 110 or multiple satellites 110 of satellite swarm 105) via a set of antennas in accordance with a set of weighting coefficients. Each of the multiple signals may be associated with a separate spatial stream and may carry bits associated with the same data stream (e.g., the same codeword) or different data streams (e.g., different codewords). MIMO techniques include single-user MIMO (SU-MIMO), where multiple spatial layers are used to communicate with one device, and multiple-user MIMO (MU-MIMO), where multiple spatial layers are used to communicate with multiple devices.

To determine weighting coefficients to apply to the set of antennas such that the N spatial layers are formed, an (M×N) MIMO matrix may be formed, where M may represent the quantity of antennas of the set of antennas. In some examples, M may be equal to N. The MIMO matrix may be determined based on a channel matrix and used to isolate the different spatial layers of the channel. In some examples, the weighting coefficients are selected to emphasize signals transmitted using the different spatial layers while reducing interference of signals transmitted in the other spatial layers. Accordingly, processing signals received at each antenna with the set of antennas (e.g., a signal received at the set of antennas) using the MIMO matrix may result in multiple signals being output, where each of the multiple signals may correspond to one of the spatial layers. The elements of the MIMO matrix used to form the spatial layers of the channel may be determined based on channel sounding probes received at satellite swarm 105—e.g., from one or more devices. In some examples, the weighting coefficients used for MIMO communications may be referred to as beam coefficients, and the multiple signals or spatial layers may be referred to as beam signals.

Beamforming techniques may be used to shape or steer a communication beam along a spatial path between satellite swarm 105 and a geographic area. A communication beam may be formed by determining weighting coefficients for antenna elements of an antenna array that result in the signals transmitted from or received at the antenna elements being combined such that signals propagating in a particular orientation with respect to an antenna array experience constructive interference while others experience destructive interference. Thus, beamforming may be used to transmit signals having energy that is focused in a direction of a communication beam and to receive signals that arrive in a direction of the communication with increased signal power (relative to the absence of beamforming). The weighting coefficients may be used to apply amplitude offsets, phase offsets, or both to signals carried via the antennas. In some examples, the weighting coefficients applied to the antennas may be used to form multiple beams associated with multiple directions, where the multiple beams may be used to communicate multiple signals having the same frequency at the same time. The weighting coefficients used for beamforming may be referred to as beam coefficients, and the multiple signals may be referred to as beam signals.

In some examples, beamforming techniques may be used by satellite swarm 105 to form spot beams that are tiled (e.g., tessellated) across a geographic area. In some examples, the wireless spectrum used by satellite swarm 105 may be reused across sets of the spot beams for communications between terminals 120 and the satellite swarm 105. In some examples, the wireless spectrum can be reused in spot beams that do not overlap, where a contiguous geographic region can be covered by overlapping spot beams that each use orthogonal resources (e.g., orthogonal time, frequency, or polarization resources). In some examples, satellites of the satellite swarm 105 may communicate with terminals 120 via communications beams 119 within a subarea 155 of the geographic area 150.

Satellites 110 occupying a geostationary Earth orbit with 0 degrees of inclination relative to the equator of a planet (e.g., Earth) may have no apparent motion from the surface of the planet and may project a stationary (e.g., single point) ground track on the equator. Satellites 110 with a geosynchronous orbit may have a small inclination relative to the equator and may have apparent periodic motion with a period of one sidereal day and may trace a ground track ellipse around a single point on the equator of the surface of the planet. As the amount of inclination relative to the equator grows (e.g., becomes non-zero), the satellites 110 may have apparent periodic motion with a period of one sidereal day and may track a ground track analemma (e.g., a FIG. 8) around a single point on the equator of the surface of the planet. In some examples, the satellites 110 of satellite swarm 105 may include one or more satellites in geostationary Earth orbit or a geosynchronous orbit. For example, satellite swarm 105 may include one or more satellites in geostationary Earth orbit occupying one or more orbital slots (e.g., as defined along the GEO arc), as well as one or more satellites in a geosynchronous orbit that occupy the same one or more orbital slots, with a small inclination relative to a geostationary Earth orbit.

When the ground track of the geosynchronous satellite across a sidereal day is a single point or an ellipse or analemma with a small size (e.g., a size below a threshold size), the amount of angular deviation or pointing associated with using a ground-based antenna to keep the satellite 110 in a main beam of the ground-based antenna of maximum signal gain may be zero or below a threshold amount. Accordingly, in such examples, the ground-based antennas may be fixed or may have a scan angle below a threshold amount. As such, the ground-based antennas may refrain from performing continuous tracking of satellites, which may be associated with a higher energy consumption than remaining fixed or moving with the scan angle below the threshold amount.

In some examples, a set of satellites 110 may be co-located in a satellite swarm 105. As used herein, satellites that are co-located may be understood to share an orbital slot, or orbit together such that they stay within an aperture area that can be used for communication with terminals or ground stations. In some cases, the set of satellites 110 may be in a same geosynchronous orbital slot (e.g., within 0.1 degrees of longitude and 0.1 degrees of latitude relative to the equator of the planet). The geosynchronous orbital slot may have a square shape with equal dimensions for height and width (e.g., 126 km). The satellite swarm 105 may use ground-based signal processing for ground-based calibration of the location of each element of the satellite swarm 105 (e.g., each satellite 110). Additionally, an array of ground-based antennas receiving raw (e.g., unprocessed) or at least partially processed signal information collected by each satellite 110 may be present (e.g., multiple ground systems 135 and/or multiple access nodes 140 in the ground system 135). The signal information may be communicated to a central processor 130. In some examples, after calibration, the satellite swarm 105, central processor 130, and/or a network device 132 coupled with the ground-based antennas may identify the locations of satellites 110 within a quarter wavelength of a communication frequency (e.g., a carrier frequency).

In some examples, central processor 130 may perform a-priori prediction and/or estimation of signal phase-of-arrival on each satellite 110 and/or each antenna element using geometric modeling. Additionally or alternatively, central processor 130 may process training data received at the satellites 110 to discover phase-of-arrival correlation on each satellite 110 and/or each antenna element. Satellites 110 of the satellite swarm 105 may support one or more of multiple MIMO modes that include different levels or types of MIMO processing including channel synthesis from channel sounding probes transmitted by reference terminals (e.g., which may be included in terminals 120, or may be separate terminals for transmission of channel sounding probes).

As the speed of satellites within satellite swarm 105 relative to each other decreases, the amount of recalibrations performed for the satellite swarm 105 (e.g., such that the positions of the satellites 110 of the satellite swarm 105 are identified within a quarter wavelength of the communication frequency) over a fixed duration of time may also decrease. Due to the positions of the satellites 110 being identified within the quarter wavelength, a system providing a signal processing basis set of two independent means of signal correlation may be realized which may correlate antenna signal energy independently or in combination. The antenna signal energy may correlated so as to algorithmically adapt to supply system benefits depending on user terminal circumstances. For instance, a first independent means of signal correlation may include collecting signal energy by an antenna set and correlating the collected signal energy by a process of using training data to discover the correlation of signals received by the antenna elements using operations (e.g., linear algebra, probability, statistical processing). A second independent means of signal correlation may include collecting signal energy by the antenna set and correlating using a priori knowledge of the user terminal position and the positions of the satellites 110 (e.g., and/or of antenna elements of the satellites 110).

Implementing the satellite swarm 105 may have one or more benefits as compared to implementing a terrestrial-based system. For instance, the satellite swarm 105 may have a lower gravitational load as compared to the terrestrial-based system. Additionally, the satellite swarm 105 may encounter fewer variable weather and temperature conditions. Additionally, the satellite swarm 105 may encounter fewer environmental disturbances as compared to terrestrial-based system.

In some examples, a multiplicity of satellites 110 may be assembled in a satellite swarm 105 in a single geosynchronous orbital slot (e.g., a square with dimensions of 126 km on each side), where each satellite 110 hosts one or more antenna elements (e.g., arranged in an antenna array 115). Each satellite 110 in the satellite swarm 105 may have one or more communications systems. For instance, each satellite 110 may have a first system for in-band-user-terminal communications for user communications services (e.g., communications between the satellite 110 and a terminal 120) and a second system for out-of-user-terminal-band communications for ground-based signal processing (e.g., communications between the satellite 110 and the ground system 135).

In some examples, employing satellite swarms 105 that use ground-based processing may have one or more advantages over other geosynchronous single-satellite methods. For instance, such satellite swarms 105 may enable incremental provisioning of services. For instance, to add additional users, additional ground-based signal processing antennas (e.g., additional ground systems 135 and/or access nodes 140) and capacity may be employed and/or additional satellites 110 may be launched. Employing the additional ground-based antennas and/or launching additional satellites may be associated with using fewer resources than upgrading a capacity of satellites 110 that are already launched. Additionally, using satellite swarms 105 with ground-based processing may enable incremental upgrades and replacement. For instance, to upgrade a satellite swarm, a new satellite 110 may be launched. Additionally, using satellite swarms 105 with ground-based processing may enable an increase in user density, increased resilience to ground-based and space-based interferers (e.g., beamforming with the satellites 110 may be used to null ground and space-based interferers), and increased tolerance to fault mechanisms (e.g., kinetic fault mechanisms such as collisions as satellites 110 are distributed over a dispersed area and service may be provided even after losing one satellite 110).

In some examples, a satellite 110 of the satellite swarm may operate according to a first baseline ground processing mode (e.g., baseline ground processing mode 1) in which time domain and/or frequency domain modulation techniques are used to establish total bits per hertz. In other examples, spatial domain modulation techniques as well as time domain and/or frequency domain modulation techniques may be used in a second baseline processing mode (e.g., baseline ground processing mode 2) and a third baseline processing mode (e.g., baseline ground processing mode 3) to establish total bits per hertz. In some such examples, multiple ground systems 135 and/or access nodes 140 may be employed and may be in fixed locations separated by above a threshold amount. For the second baseline processing mode, a frequency reuse from 2 to j (e.g., where j is the number of elements in an aperture) may be employed and calibration using a geometric sweep may be performed. For the third baseline processing mode, a frequency reuse of 2 to n (e.g., where n is the number of satellites in a particular geosynchronous slot) may be employed and calibration using a long training data sequence and MIMO to discover correlation for each physically separate ground station (e.g., ground system 135, access node 140) may be performed. The first baseline ground processing mode may be associated with a single ground station frequency set per hemisphere (e.g., frequency reuse of 1) and the second and third baseline ground processing modes may be associated with multiple ground stations in each hemisphere with a full frequency set reuse.

Figure 2:
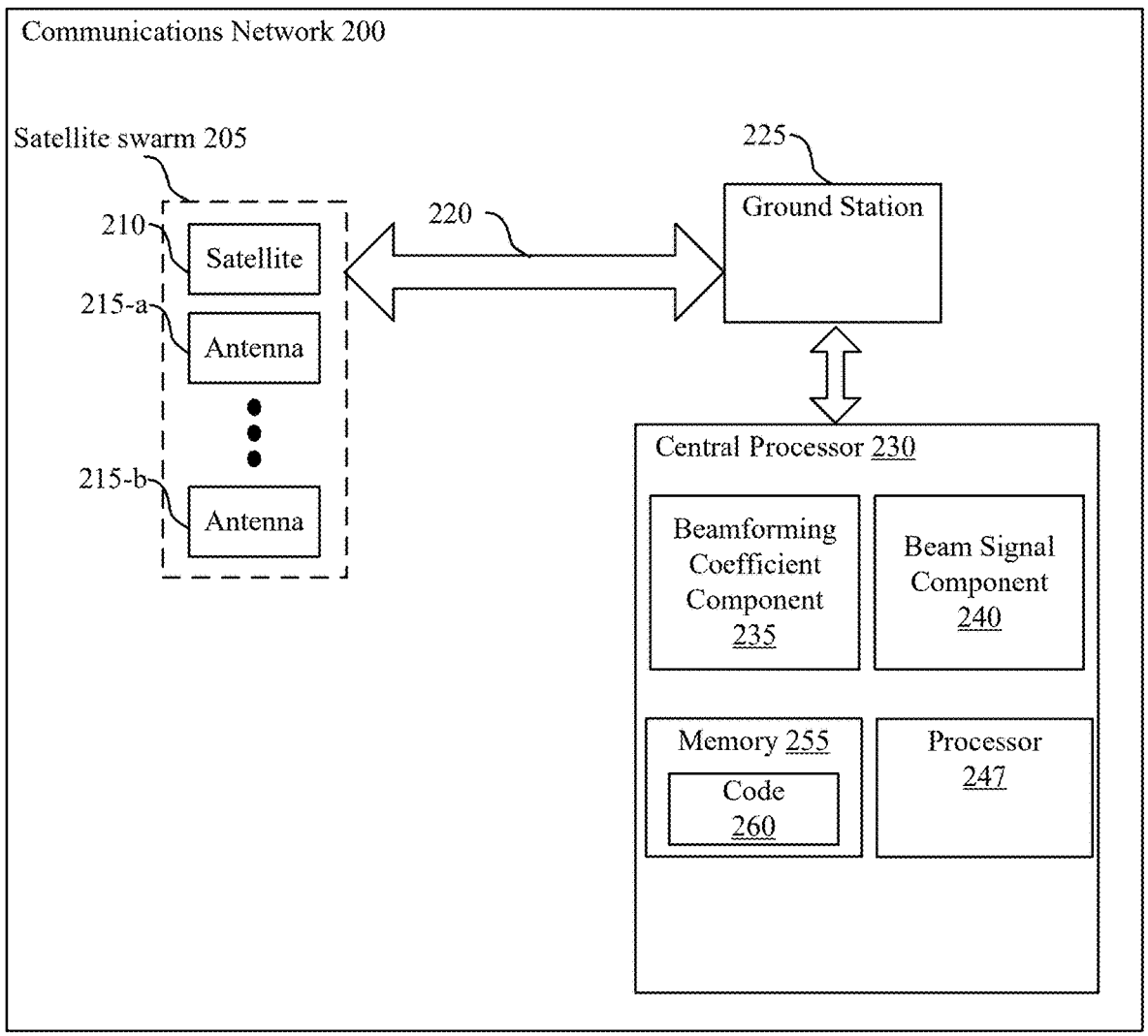
FIG. 2 illustrates an example of a communications network that supports co-located satellites with ground based processing in accordance with aspects described herein.

FIG. 2 shows an example of a communications network 200 that supports beamforming using sparse antenna arrays in accordance with examples described herein.

Communications network 200 depicts a system for communicating using one or more of MIMO techniques, geometric interpretation techniques, and geometrically-informed MIMO techniques. Communications network 200 may include a satellite swarm 205, satellite 210, antennas 215-a and 215-b, communication link 220, ground station 225, central processor 230, beamforming coefficient component 235, beam signal component 240, and memory 255 (including code 260). At least a portion (e.g., all) of communications network 200 may be located within a space segment of communications network 200 (e.g., in a satellite system). In some examples, a portion of communications network 200 that is not included in the space segment may be located within a ground segment of communications network 200 (e.g., in a ground system). For example, satellite swarm 205 (e.g., including satellite 210 and antennas 215-a and 215-b) may be included in a space segment of communications network 200, while ground station 225 and central processor 230 may be included in a ground segment of communications network 200.

Satellite swarm 205 may be an example of a satellite swarm 105 as described with reference to FIG. 1 and satellite 210 may be an example of a satellite 110 as described with reference to FIG. 1. Antennas 215-a and 215-b may represent antennas at a single satellite (e.g., at an antenna array of satellite 210) or may represent additional different satellites of satellite swarm 205, each having an antenna or antenna array.

Link 220 may represent an interface over which signals may be exchanged between the satellite swarm 205 and a central location that may be used to distribute the signal to the signal processing components of communications network 200 (e.g., beamforming coefficient component 235, beam signal component 240). Link 220 may be a wireless interface that is used to wirelessly communicate signaling between satellite swarm 205 and the signal processing components. Link 220 may support point to point (e.g., from one satellite to one ground station), or point to multi-point (e.g., from one satellite to multiple ground stations) communication.

Beamforming coefficient component 235 may apply a set of beamforming coefficients to representations of return link signal components received by the ground station 225. Additionally or alternatively, beamforming coefficient component 235 may apply, at the central processor, a set of forward link beamforming coefficients to one or more forward link beam signals to obtain representations of forward link signal components for transmission by the set of co-located satellites.

Beam signal component 240 may obtain one or more return link beam signals corresponding to one or more return link beams from the set of co-located satellites based on beamforming coefficient component 235 applying the set of beamforming coefficients. In some examples, beam signal component 240 may obtain a first set of return link beam signals corresponding to a first set of return link beams associated with a first set of return link coverage areas, where the first set of return link coverage areas are non-overlapping with each other. Additionally, the beam signal component 240 may obtain a second set of return link beam signals corresponding to a second set of return link beams associated with a second set of return link coverage areas, where the second set of return link coverage areas are non-overlapping with each other.

Central processor 230 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). The central processor 230 may be configured to execute computer-readable instructions stored in a memory (e.g., memory 255) to cause the communications network 200 to perform various functions (e.g., functions or tasks supporting beamforming using sparse antenna arrays). For example, the communications network 200 or a component of the communications network 200 may include a processor 247 and memory 255 coupled to or included in the central processor 230 that are configured to perform various functions described herein.

The memory 255 may include random access memory (RAM) and/or read-only memory (ROM). The memory 255 may store code 260 that is computer-readable and computer-executable. The code 260 may include instructions that, when executed by the processor 247, cause the communications network 200 to perform various functions described herein. The code 260 may be stored in a non-transitory computer-readable medium such as system memory or another type of memory. In some cases, the code 260 may not be directly executable by the processor 247 but may cause a computer (e.g., when compiled and executed) to perform functions described herein. In some cases, the memory 255 may contain, among other things, a basic I/O system (BIOS) which may control basic hardware or software operation such as the interaction with peripheral components or devices.

In some examples, beamforming coefficient component 235, beam signal component 240, or various combinations or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, beamforming coefficient component 235, beam signal component 240, or various combinations or components thereof, may be implemented in code 260 (e.g., as communications management software or firmware), executed by central processor 230. If implemented in code 260 executed by processor 247, the functions of beamforming coefficient component 235, beam signal component 240, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, a combination of ground-based processing and space-based processing may be employed. For example, a first user capacity may be provided using ground-based processing and a second, reduced user capacity may be provided using space-based processing. For instance, a swarm of satellites (e.g., a swarm including satellite 210 and additional antennas 215-a and 215-b, which may be additional satellites) may be in a location (e.g., a geographic region) where it may be advantageous to generate a fewer number of beams or in which links to ground station(s) may be lower capacity. In some such examples, a local processor of the swarm (e.g., a space-based processor) may receive signal components and may perform reduced processing to generate a fewer number of wider beam signals (e.g., as opposed to a greater number of narrower beam signals). Additionally or alternatively, the local processor may process a reduced number of signal components (e.g., forward link signal components, return link signal components) or beamforming coefficients. These fewer signal components may correspond to a lower number of satellites present within the swarm or may correspond to multiple satellites of the swarm (e.g., adjacent satellites) being grouped together for application of beamforming coefficients. For example, for transmission of forward link signal components, the local processor may apply a same beamforming coefficient to a forward link beam signal to obtain forward link signal components for a group of satellites of the swarm, and for reception of return link signal components, the local processor may apply a same beamforming coefficient to the representations of the return link signal components from the group of satellites. Such methods may be employed when the swarm of satellites are over a particular geographic region (e.g., the north pole, the south pole, an ocean where there is a low user density). Additionally or alternatively, such methods may be employed when a number of ground stations available for communication fails to satisfy a threshold and/or when a signal metric associated with one or more of a set of ground stations fails to satisfy a threshold.

Figure 3:
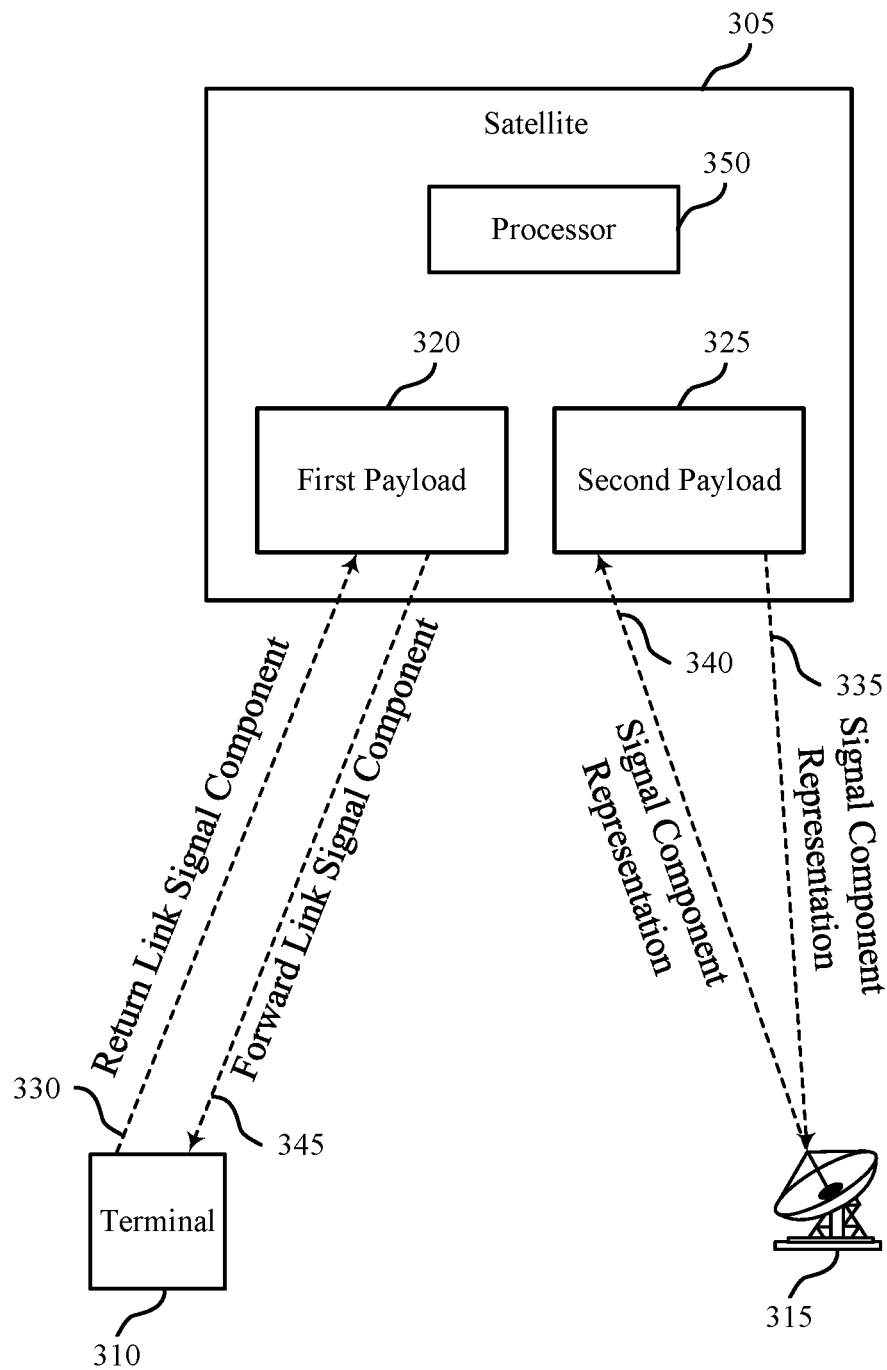
FIGS. 3 through 7 illustrate examples of communications schemes that support co-located satellites with ground based processing in accordance with aspects described herein.

FIG. 3 illustrates an example of a communications scheme 300 that supports co-located satellites with ground based processing in accordance with aspects described herein. In some examples, communications scheme 300 may be implemented by one or more aspects of satellite communications system 100 and/or communications network 200. For instance, satellite 305 may be an example of a satellite 110 as described with reference to FIG. 1 and/or a satellite 210 as described with reference to FIG. 2; terminal 310 may be an example of a terminal 120 as described with reference to FIG. 1; and ground station 315 may be an example of a ground system 135 as described with reference to FIG. 1 and/or a ground station 225 as described with reference to FIG. 2.

Satellite 305 may include a first payload 320, a second payload 325, and a processor 350. The first payload 320 may be configured to communicate with terminal 310 and the second payload 325 may be configured to communicate with ground station 315. For instance, the first payload 320 may be configured to receive a return link signal component 330 from terminal 310 and second payload 325 may be configured to transmit a representation 335 of the return link signal component 330 to ground station 315. Additionally or alternatively, the second payload 325 may be configured to receive a representation 340 of a forward link signal component 345 from ground station 315 and transmit the forward link signal component 345 to terminal 310.

In some examples, satellite 305 may be one of a set of co-located satellites. In some such examples, the set of co-located satellites may be configured to collect a set of return link signal components. For instance, the satellite 305 may collect return link signal component 330 over a first frequency range via the first payload 320. Additionally, the set of co-located satellites may be configured to transmit a representation of the respective return link signal component that each satellite receives. For instance, the satellite 305 may transmit the representation 335 of the return link signal component 330 via the second payload 325.

In some examples, ground station 315 may be one of one or more ground stations configured to receive the representations of the respective return link signal components. For instance, ground station 315 may receive the representation 335 of the return link signal component 330 from second payload 325. Alternatively, the second payload 325 may transmit the representation 335 of the return link signal component 330 to a central satellite, and the central satellite may transmit the representation 335 to the ground station 315.

In some examples, a central processor (e.g., a central processor 230 as described with reference to FIG. 2) coupled with ground station 315 may be configured to apply a set of beamforming coefficients to the representations of the respective return link signal components received by the one or more ground stations including ground station 315 to obtain one or more return link beam signals corresponding to one or more return link beams from the set of co-located satellites including satellite 305. Additionally, the central processor may be configured to obtain a first set of return link beam signals corresponding to a first set of return link beams associated with a first set of return link coverage areas. In some such examples, the first set of return link coverage areas may be non-overlapping with each other. In some examples, the central processor may be configured to obtain a second set of return link beam signals corresponding to a second set of return link beams associated with a second set of return link coverage areas. In some such examples, the second set of return link coverage areas may be non-overlapping with each other. Additionally or alternatively, the second set of return link beams may be associated with one or more second return link beams associated with one or more second return link signals transmitted from one or more second terminals over a second frequency range. For instance, terminal 310 may transmit return link signal component 330 over a first frequency range that differs from a second frequency range over which another terminal transmits a respective return link signal component.

In some examples, a first ground station (e.g., ground station 315) of the one or more ground stations may be configured to receive a first representation of a first return link signal component (e.g., representation 335) from a first satellite (e.g., 305) and a second ground station (e.g., another ground station coupled with the central processor) may be configured to receive a second representation of a second return link signal component from a second satellite of the set of co-located satellites. In some such examples, the first and second ground stations may receive the respective representations based on the first satellite being configured to transmit the first representation of the first return link signal component within a first coverage area excluding a second coverage area to which the second satellite is configured to transmit the second representation of the second return link signal component.

In some examples, the second payloads of the set of co-located satellites are configured to receive respective representations of forward link signal components. For instance, the second payload 325 of satellite 305 may be configured to receive a representation 340 of a forward link signal component 345. The first payloads of the set of co-located satellites may be configured to transmit the forward link signal components based on the received respective representations of the forward link signal components. For instance, the first payload 320 of satellite 305 may be configured to transmit the forward link signal component 345 based on the received representation 340 of the forward link signal component 345. In some examples, the central processor may be configured to apply a set of forward link beamforming coefficients to the one or more forward link beam signals to obtain the representations of the forward link signal components, and the one or more ground stations coupled with the central processor may be configured to transmit the representations of the forward link signal components to the set of co-located satellites.

In some examples, the central processor may be configured to identify a location of each satellite of the set of co-located satellites and to generate the set of beamforming coefficients based on the identified location. Additionally or alternatively, a central satellite communicating with the satellite 305 and/or a local processor (e.g., processor 350) may be configured to identify the location of each satellite of the set of co-located satellites. In some examples, each satellite 305 may transmit a ranging signal to a central satellite or other satellites 305 for determining the location of each satellite of the set of co-located satellites.

In some examples, the inter-satellite spacing of adjacent satellites along the first dimension or a second dimension orthogonal to the first dimension may be greater than a distance that is equivalent to a wavelength of the return link signal components. Additionally or alternatively, the inter-satellite spacing of adjacent satellites of the set of co-located satellites along the first dimension or a second dimension orthogonal to the first dimension may be greater than distance that is equivalent to ten times a wavelength of the return link signal components.

In some examples, the processor 350 may perform sampling according to a common reference timing. For instance, when satellite 305 receives return link signal component 330, processor 350 may (e.g., with first payload 320) synchronize to a reference timing, perform sampling (e.g., on return link signal component 330), format the return link signal component 330 into the representation 335 of return link signal component 330, or any combination thereof. Additionally or alternatively, when satellite 305 receives representation 340 of forward link signal component 345, processor 350 may format (e.g., perform filtering, digital-to-analog conversion, frequency conversion) the representation 340 into forward link signal component 345 for transmission via first payload 320.

In some examples, the central processor may be configured to apply and/or may apply the set of beamforming coefficients to the representations of the respective return link signal components to obtain the one or more return link beam signals at a first time. Additionally, the local processor 350 may be configured to obtain representations of respective return link signal components from other satellites of the set of co-located satellites, and may apply a second set of beamforming coefficients to at least a subset of the representations of the respective return link signal components to obtain one or more second return link beam signals at a second time. The local processor 350 may transmit the one or more second return link beam signals to a ground station.

Figure 4:
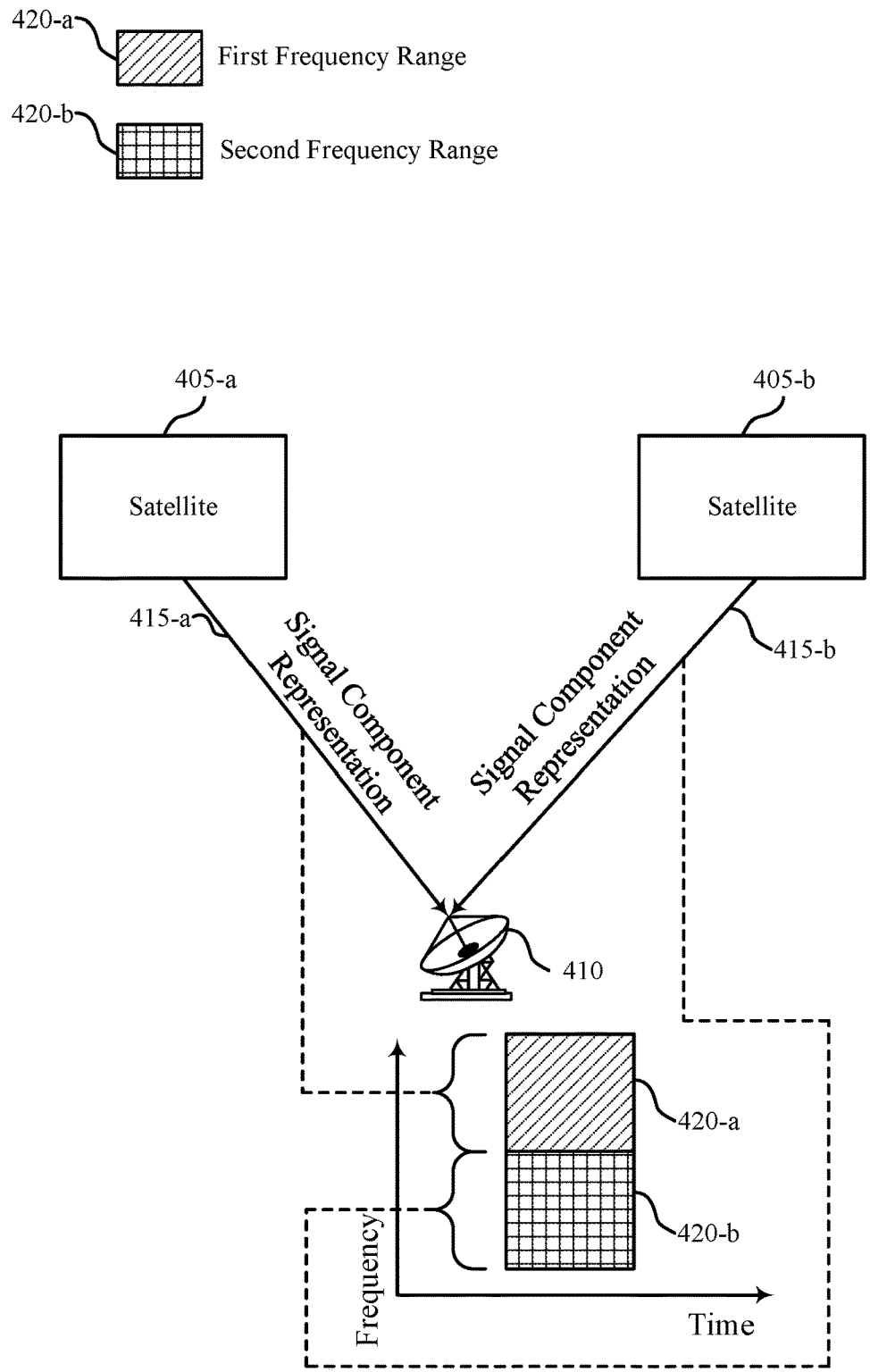

FIG. 4 illustrates an example of a communications scheme 400 that supports co-located satellites with ground based processing in accordance with aspects described herein. In some examples, communications scheme 400 may be implemented by one or more aspects of satellite communications system 100, communications network 200, communications scheme 300, or any combination thereof. For instance, satellites 405-a and 405-b may each be an example of a satellite 110 as described with reference to FIG. 1, a satellite 210 as described with reference to FIG. 2, or a satellite 305 as described with reference to FIG. 3, and ground station 410 may be an example of a aspects of a ground system 135 as described with reference to FIG. 1, a ground station 225 as described with reference to FIG. 2, or a ground station 315 as described with reference to FIG. 3. Additionally, signal component representations 415-a and 415-b may be an example of a representation 335 of a return link signal component 330.

Satellites 405-a and 405-b may each be a respective satellite of a set of co-located satellites. In some examples, satellites 405-a and 405-b may each communicate with ground station 410. For instance, satellite 405-a may transmit a first signal component representation 415-a (e.g., a representation of a first signal component) and satellite 405-b may transmit a second signal component representation 415-b (e.g., a representation of a second signal component) to ground station 410. In some examples, satellite 405-*a* may transmit the first signal component representation 415-*a* over a first frequency range 420-*a* and satellite 405-*b* may transmit the second signal component representation 415-*b* over a second frequency range 420-*b*, where the first frequency range may be different than (e.g., exclusive of) the second frequency range. In some examples, one or both of first frequency range 420-*a* and second frequency range 420-*b* may be different than (e.g., exclusive of, higher than) a range of frequencies over which satellites 405-*a* and 405-*b* communicate with a terminal (e.g., terminals from which satellites 405-*a* and 405-*b* may receive signal components). Transmitting the respective signal component representations over different frequency ranges may allow multiple signal components 415 to be received from multiple satellites 405 concurrently at the same ground station 410.

In some examples, a set of satellites including satellites 405-*a* and 405-*b* may transmit respective signal component representations using spatial multiplexing, frequency multiplexing, or both. For instance, a first subset of the set of satellites may transmit respective signal component representations to a first ground station and a second subset of the set of satellites may transmit respective signal component representations to a second ground station spatially separated from the first ground station. Additionally, each satellite within the first subset of satellites may transmit respective signal component representations over a different frequency range than each other satellite of the first subset of satellites. Similarly, each satellite within the second subset of satellites may transit respective signal component representations over a different frequency range than each other satellite of the second subset of satellites.

A forward link communication scheme may be implemented in a similar manner to that shown for the return link for communication scheme 400. In some examples, ground station 410 may transmit forward link signal component representations to satellites 405-*a* and 405-*b*. For instance, ground station 410 may transmit a first forward link signal component representation to satellite 405-*a* and a second forward link signal component representation to satellite 405-*b*. In some examples, a central processor coupled with the ground station 410 may apply a set of forward link beamforming coefficients to beam signals to obtain the first forward link signal component representation and the second forward link signal component representation. In some examples, ground station 410 may transmit the first forward link signal component representation over first frequency range 420-*a* and may transmit the second forward link signal component representation over second frequency range 420-*b*. Satellite 405-*a* may convert (e.g., to a frequency used for forward link signals to a user terminal) the first forward link signal component representation to a first forward link signal component and satellite 405-*b* may convert (e.g., to the frequency used for forward link signals to the user terminal) the second forward link signal component representation to a second forward link signal component. Satellite 405-*a* may transmit the first forward link signal component and satellite 405-*b* may transmit the second forward link signal component. In a similar manner, additional satellites 405 may transmit additional forward link signal components, and the forward link signal components may result in a forward link beam carrying data for one or more user terminals.

Figure 5:
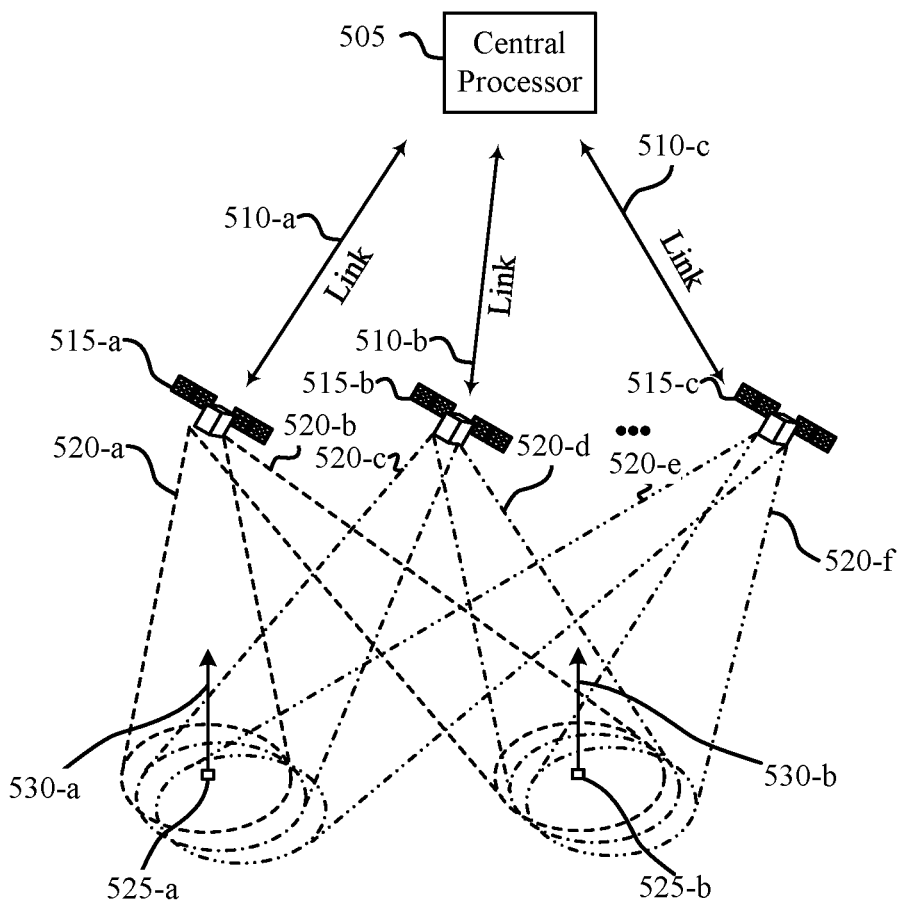

FIG. 5 illustrates an example of a communications scheme 500 that supports co-located satellites with ground based processing in accordance with aspects described herein. In some examples, communications scheme 500 may be implemented by one or more aspects of satellite communications system 100 and/or communications network 200. For instance, central processor 505 may be an example of a central processor 230 as described with reference to FIG. 2; satellites 515-*a*, 515-*b*, and 515-*c* may each be an example of a satellite 110, 210, or 305 as described with reference to FIGS. 1-3; and terminals 525-*a* and 525-*b* may each be an example of a terminal 120 as described with reference to FIG. 1.

Each of satellites 515-*a*, 515-*b*, and 515-*c* may be configured to communicate with one or more terminals. For instance, satellite 515-*a* may be configured to communicate with terminal 525-*a* via communication beam 520-*a* and to communicate with terminal 525-*b* via communication beam 520-*b*; satellite 515-*b* may be configured to communicate with terminal 525-*a* via communication beam 520-*c* and to communicate with terminal 525-*b* via communication beam 520-*d*; and satellite 515-*c* may be configured to communicate with terminal 525-*a* via communication beam 520-*e* and to communicate with terminal 525-*b* via communication beam 520-*f*. In some examples, each of satellites 515-*a*, 515-*b* and 515-*c* may communicate with the one or more terminals using a respective first payload. Additionally, each of satellites 515-*a*, 515-*b*, and 515-*c* may be configured to communicate with a central processor 505 (e.g., via a set of one or more ground stations). For instance, satellite 515-*a* may be configured to communicate with the central processor 505 via communication link 510-*a*; satellite 515-*b* may be configured to communicate with the central processor 505 via communication link 510-*b*; and satellite 515-*c* may be configured to communicate with the central processor 505 via communication link 510-*c*.

In some examples, the first payload of each of satellites 515-*a*, 515-*b*, and 515-*c* may include a respective set of antenna elements (e.g., an antenna array 115) and a respective local processor. The respective local processor may be configured to perform beamforming of a set of local component signals received at the set of antenna elements to obtain one or more respective signal components. For instance, terminal 525-*a* may transmit a first signal 530-*a* and terminal 525-*b* may transmit a second signal 530-*b*. The first signal 530-*a* and the second signal 530-*b* may be transmitted concurrently over a same frequency range. Satellite 515-*a* may receive respective local component signals of the first signal 530-*a* and the second signal 530-*b* at its set of antenna elements, and may form communication beam 520-*a* and communication beam 520-*b* from the respective component signals using a set of local beamforming coefficients to obtain a first local beam signal associated with communication beam 520-*a* and a second local beam signal associated with communication beam 520-*b*. Similarly, satellite 515-*b* may receive respective local component signals of the first signal 530-*a* and the second signal 530-*b* at its set of antenna elements, and may form communication beam 520-*c* and communication beam 520-*d* from the respective component signals using a set of local beamforming coefficients to obtain a third local beam signal associated with communication beam 520-*c* and a fourth local beam signal associated with communication beam 520-*d*. In addition, satellite 515-*c* may receive respective local component signals of the first signal 530-*a* and the second signal 530-*b* at its set of antenna elements, and may form communication beam 520-*e* and communication beam 520-*f* from the respective component signals using a set of local beamforming coefficients to obtain a fifth local beam signal associated with communication beam 520-*e* and a sixth local beam signal associated with communication beam 520-*f*. That is, the local processor of each of satellites 515-*a*, 515-*b*, and 515-*c* may be configured to obtain a first representation of the respective signal component corresponding to a respective first local beam associated with a first local coverage area from the set of local component signals received at the set of elements and to obtain a second representation of a respective signal component corresponding to a respective second local beam associated with a second local coverage area from the set of local component signals received at the set of elements. In some such examples, the respective first local beam and a the respective second local beam may be associated with at least partially overlapping frequency ranges. In some examples, the central processor 505 may be configured to obtain a first beam signal based on applying a first set of beamforming coefficients to the first representations obtained by each of satellites 515-a, 515-b, and 515-c and to obtain a second beam signal based on applying a second set of beamforming coefficients to the second representations obtained by each of satellites 515-a, 515-b, and 515-c. For example, the central processor 505 may apply a set of beamforming coefficients (e.g., which may include M beamforming coefficients, where M corresponds to the number of satellites 515 applying local beamforming coefficients to obtain a local beam) to obtain beam signals corresponding to beams that are compound beams formed from local beams 520 associated with a coverage area or terminal 525. In one example, the central processor 505 may apply a first set of beamforming coefficients to the first, third, and fifth local beam signals to obtain a first beam signal associated with the first signal 530-a and apply a second set of beamforming coefficients to the second, fourth, and sixth local beam signals to obtain a second beam signal associated with the second signal 530-b.

A forward link communication scheme may be implemented in a similar manner to that shown for the return link for communication scheme 500. For instance, a central processor may apply beamforming coefficients to a first forward link beam signal and a second forward link beam signal to obtain respective representations of first forward link signal components and respective representations of second forward link signal components, respectively. Each of satellites 515-a, 515-b, and 515-c may receive a respective representation of the first forward link signal component and a respective representation of the second forward link signal component weighted according to the applied beamforming coefficients and corresponding to each beam. Each of satellites 515-a, 515-b, and 515-c may apply a set of beamforming coefficients to each received representation (e.g., a different set of beamforming coefficients for each representation or a same set of beamforming coefficients for both representations) to generate local forward link signal components to be transmitted from each antenna element of each of satellites 515-a, 515-b, and 515-c to terminals 525-a and 525-b to form local beams 520. Local beams 520 may then form communication beams according to the beamforming coefficients applied by the central processor.

Figure 6:
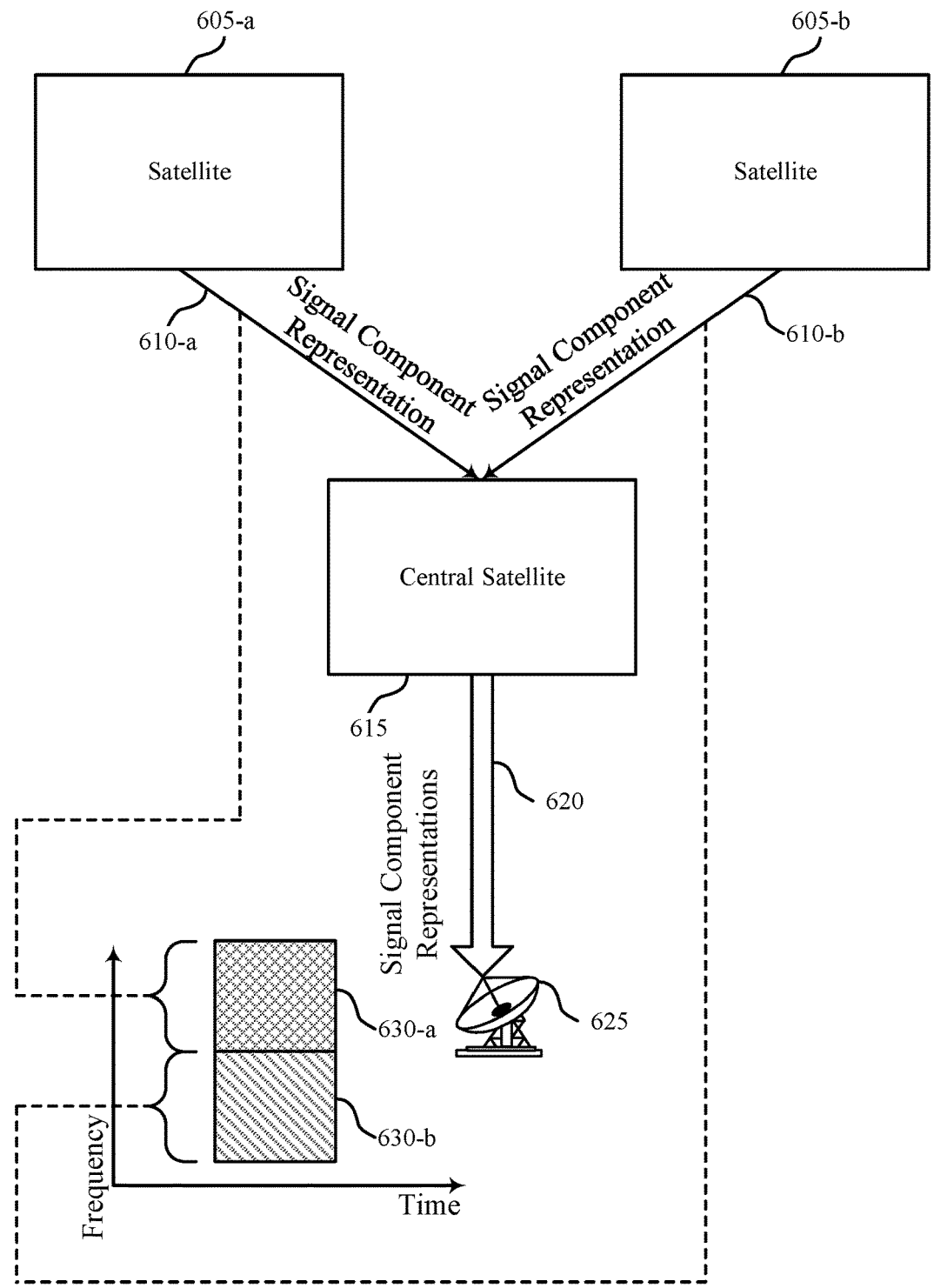

FIG. 6 illustrates an example of a communications scheme 600 that supports co-located satellites with ground based processing in accordance with aspects described herein. In some examples, communication scheme 600 may be implemented by one or more aspects of satellite communications system 100, communications network 200, communications scheme 300, or any combination thereof. For instance, satellites 605-a and 605-b and central satellite 615 may each be an example of a satellite 110 as described with reference to FIG. 1, a satellite 210 as described with reference to FIG. 2, or a satellite 305 as described with reference to FIG. 3. Ground station 625 may be an example of aspects of a ground system 135 as described with reference to FIG. 1, a ground station 225 as described with reference to FIG. 2, or a ground station 315 as described with reference to FIG. 3. Additionally, signal component representations 610-a and 610-b may be an example of a representation 335 of a return link signal component 330 as described with reference to FIG. 3.

Satellites 605-a and 605-b may each be a respective satellite of a set of co-located satellites. Additionally, central satellite 615 may be one of the set of co-located satellites or a satellite excluded from the set of co-located satellites. For example, central satellite 615 may be co-located with the set of co-located satellites, but may or may not receive signals directly from terminals. In some examples, satellites 605-a and 605-b may each communicate with central satellite 615. For instance, satellite 605-a may transmit a first signal component representation 610-a (e.g., a representation of a first signal component) and satellite 605-b may transmit a second signal component representation 610-b (e.g., a representation of a second signal component) to central satellite 615. In some examples, satellite 605-a may transmit the first signal component representation 610-a over a first frequency range 630-a and satellite 605-b may transmit the second signal component representation 610-b over a second frequency range 630-b, where the first frequency range may be different from (e.g., may be exclusive of) the second frequency range.

Central satellite 615, after receiving the first signal component representation 610-a and the second signal component representation 610-b, may combine the signal component representations to generate aggregated signal component representation 620. Aggregated signal component representation 620 may include first signal component representation 610-a and second signal component representation 610-b, and may be transmitted over a third frequency range different from the first frequency range and the second frequency range. For example, aggregated signal component representation 620 may be have a bandwidth equal or greater to a bandwidth of $N \cdot SR_{BW}$, where N may be the number of satellites in the set of co-located satellites and $SR_{BW}$ may be the bandwidth of each of the signal component representations 610. Upon generating the aggregated signal component representation 620, the central satellite may transmit the aggregated signal component representation 620 to ground station 625. Ground station 625 may extract each signal component representation from the aggregated signal component representation 620 and may apply a set of beamforming coefficients to the signal component representations to obtain one or more return link beam signals corresponding to one or more return link beams from satellites 605-a and 605-b.

A forward link communication scheme may be implemented in a similar manner to that shown for the return link for communication scheme 600. In some examples, a central processor coupled with the ground station 625 may apply a set of forward link beamforming coefficients to beam signals to obtain the respective representations of forward link signal components. The ground station 625 may aggregate the respective representations of forward link signal components to form an aggregated forward link signal component representation. In some examples, central satellite 615 may be configured to receive the aggregated forward link signal component representation from ground station 625. Additionally, central satellite 615 may be configured to separate the aggregated forward link signal component representation into a first forward link signal component representation and a second forward link signal component representation, where the central satellite 615 may transmit the first forward link signal component representation to satellite 605-*a* and may transmit the second forward link signal component representation to satellite 605-*b*. Satellite 605-*a* may transmit the first forward link signal component and satellite 605-*b* may transmit the second forward link signal component. Additional satellites 605 may transmit other forward link signal components, and the forward link signal components may form a communication beam carrying forward link signals for one or more terminals.

Figure 7:
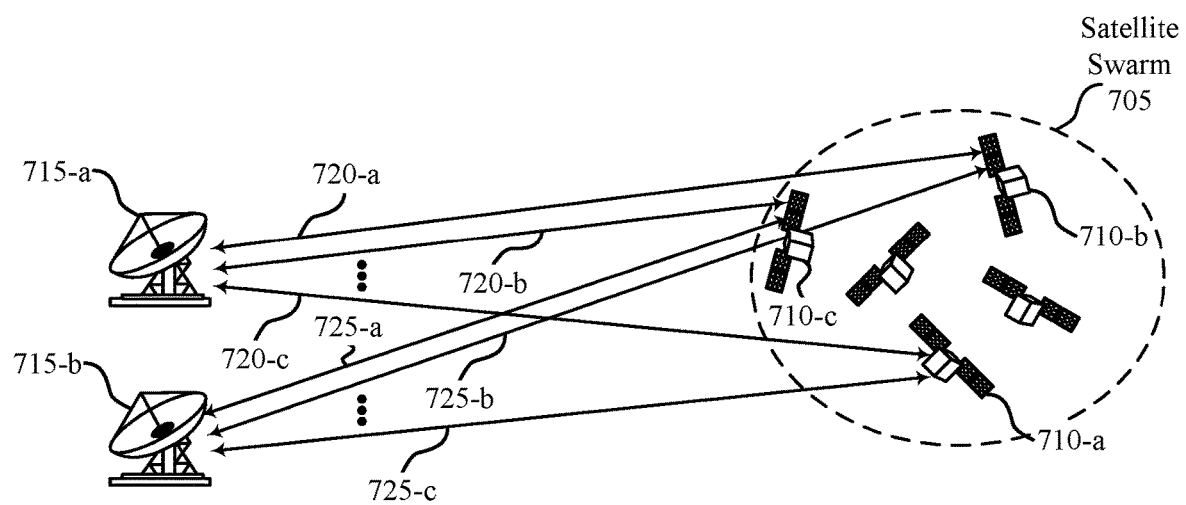

FIG. 7 illustrates an example of a communications scheme 700 that supports co-located satellites with ground based processing in accordance with examples as disclosed herein. In some examples, communications scheme 700 may be implemented by one or more aspects of satellite communications system 100 and/or communications network 200. For instance, satellite swarm 705 may be an example of a satellite swarm 105 as described with reference to FIG. 1; satellites 710-*a*, 710-*b*, and 710-*c* may each be an example of a satellite 110 as described with reference to FIG. 1, a satellite 210 as described with reference to FIG. 2, or a satellite 305 as described with reference to FIG. 3. Ground stations 715-*a* and 715-*b* may each be an example of aspects of a ground system 135 as described with reference to FIG. 1, a ground station 225 as described with reference to FIG. 2, or a ground station 315 as described with reference to FIG. 3.

Ground stations 715-*a* and 715-*b* may be configured to communicate with GEO swarm 705. For instance, satellite 710-*a* may transmit a first representation of a signal component, satellite 710-*b* may transmit a second representation of a signal component, and satellite 710-*c* may transmit a third representation of a signal component, where each of the first, second, and third representations may be received by multiple ground stations. Ground station 715-*a* may receive the first representation of the signal component as signal 720-*c* and ground station 715-*b* may receive the first representation of the signal component as signal 725-*c*. Similarly, ground station 715-*a* may receive the second representation of the signal component as signal 720-*a* and ground station 715-*b* may receive the second representation of the signal component as signal 725-*b*. Additionally or alternatively, ground station 715-*a* may receive the third representation of the signal component as signal 720-*b* and ground station 715-*b* may receive the third representation of the signal component as signal 725-*a*. In some examples, the first, second, and third signal representations may be transmitted over overlapping frequencies and/or may be associated overlapping beams (e.g., generated via a reflector on the corresponding satellite). In such examples, ground stations 715-*a* and 715-*b* may apply MIMO (e.g., apply beamforming coefficients or coding matrices to distinguish spatial layers) to distinguish between representations (e.g., to extract return feeder link beam signals).

Figure 8:
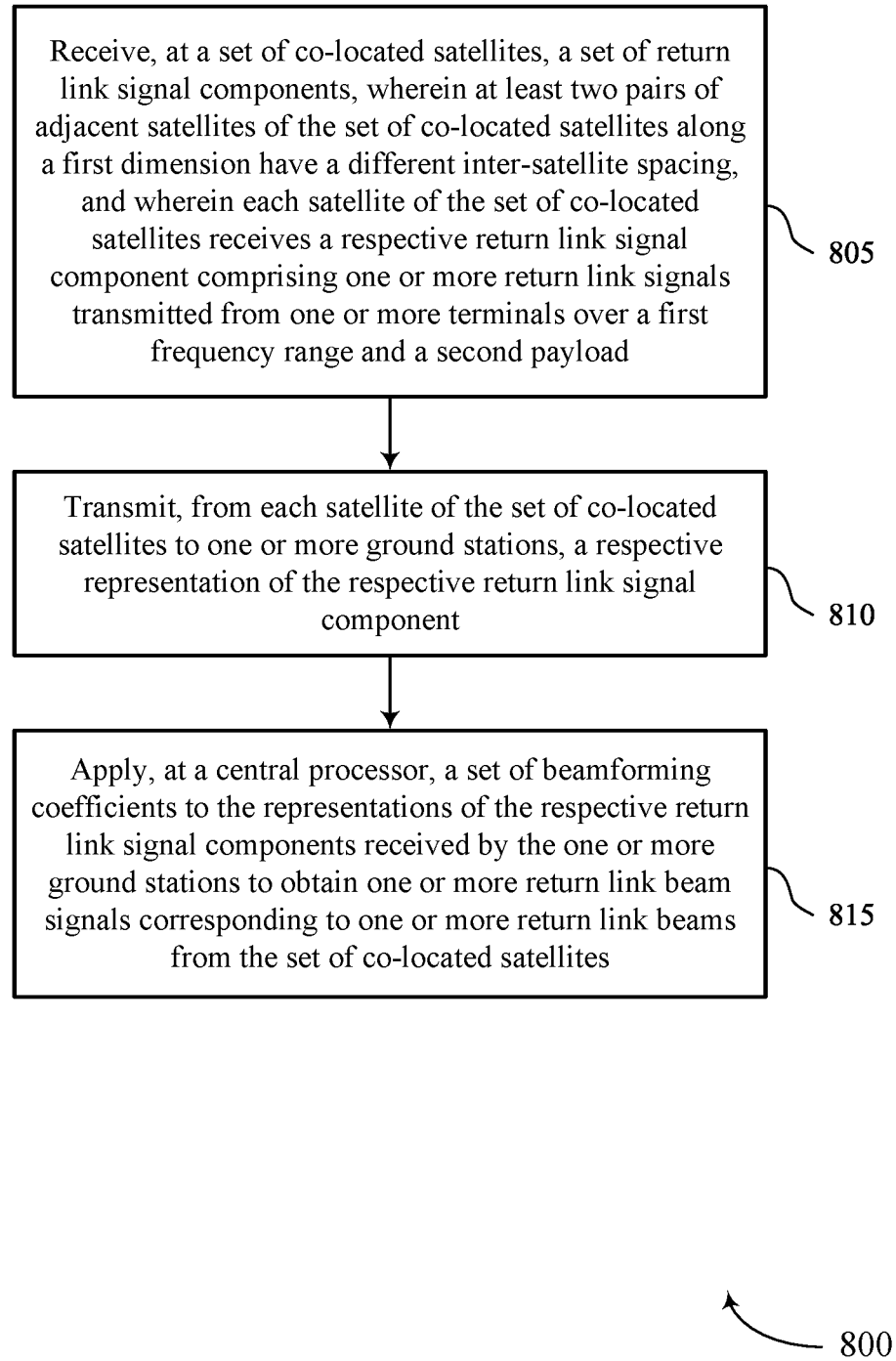
FIGS. 8 through 10 show flowcharts illustrating a method or methods that support co-located satellites with ground based processing in accordance with aspects described herein.

FIG. 8 shows a flowchart illustrating a method 800 that supports co-located satellites with ground based processing in accordance with examples as disclosed herein. The operations of method 800 may be implemented by or its components as described herein. For example, the operations of method 800 may be performed by. In some examples, may execute a set of instructions to control the functional elements of the device to perform the described functions. Additionally or alternatively, may perform aspects of the described functions using special-purpose hardware.

At 805, the method may include receiving, at a set of co-located satellites, a set of return link signal components, where at least two pairs of adjacent satellites of the set of co-located satellites along a first dimension have a different inter-satellite spacing, and where each satellite of the set of co-located satellites receives a respective return link signal component including one or more return link signals transmitted from one or more terminals over a first frequency range and a second payload. The operations of 805 may be performed in accordance with examples as disclosed herein.

At 810, the method may include transmitting, from each satellite of the set of co-located satellites to one or more ground stations, a respective representation of the respective return link signal component. The operations of 810 may be performed in accordance with examples as disclosed herein.

At 815, the method may include applying, at a central processor, a set of beamforming coefficients to the representations of the respective return link signal components received by the one or more ground stations to obtain one or more return link beam signals corresponding to one or more return link beams from the set of co-located satellites. The operations of 815 may be performed in accordance with examples as disclosed herein.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving, at a set of co-located satellites, a set of return link signal components, where at least two pairs of adjacent satellites of the set of co-located satellites along a first dimension have a different inter-satellite spacing, and where each satellite of the set of co-located satellites receives a respective return link signal component including one or more return link signals transmitted from one or more terminals over a first frequency range and a second payload; transmitting, from each satellite of the set of co-located satellites to one or more ground stations, a respective representation of the respective return link signal component; and applying, at a central processor, a set of beamforming coefficients to the representations of the respective return link signal components received by the one or more ground stations to obtain one or more return link beam signals corresponding to one or more return link beams from the set of co-located satellites.

Aspect 2: The apparatus of aspect 1, further including operations, features, circuitry, logic, means, or instructions, or any combination thereof for obtaining, at the central processor, a first plurality of return link beam signals corresponding to a first plurality of return link beams associated with a first plurality of return link coverage areas, where the first plurality of return link coverage areas are non-overlapping with each other.

Aspect 3: The apparatus of aspect 2, further including operations, features, circuitry, logic, means, or instructions, or any combination thereof for obtaining, at the central processor, a second plurality of return link beam signals corresponding to a second plurality of return link beams associated with a second plurality of return link coverage areas, where the second plurality of return link coverage areas are non-overlapping with each other, and where the second plurality of return link beams are associated with one or more second return link signals transmitted from one or more second terminals over a second frequency range.

Aspect 4: The apparatus of any of aspects 1 through 3, further including operations, features, circuitry, logic, means, or instructions, or any combination thereof for receiving, from a first satellite of the set of co-located satellites and at a first ground station of the one or more ground stations, a first representation of a first return link signal component and receiving, from a second satellite of the set of co-located satellites and at a second ground station of the one or more ground stations, a second representation of a second return link signal component based at least in part on receiving the first representation of the first return link signal component within a first coverage area excluding a second coverage area within which the second representation of the second return link signal component is received.

Aspect 5: The apparatus of any of aspects 1 through 4, further including operations, features, circuitry, logic, means, or instructions, or any combination thereof for receiving, from a first satellite of the set of co-located satellites and at a ground station of the one or more ground stations, a first representation of a first return link signal component and receiving, from a second satellite of the set of co-located satellites and at the ground station, a second representation of a second return link signal component based at least in part on receiving the first representation of the first return link signal component at a first range of frequencies excluding a second range of frequencies over which the second representation of the second return link signal component is received.

Aspect 6: The apparatus of any of aspects 1 through 5, further including operations, features, circuitry, logic, means, or instructions, or any combination thereof for applying, at the central processor, a set of forward link beamforming coefficients to one or more forward link beam signals to obtain representations of forward link signal components for transmission by the set of co-located satellites; transmitting, from the one or more ground stations and to the set of co-located satellites, the representations of the forward link signal components; receiving, at the set of co-located satellites, the respective representations of the forward link signal components; and transmitting, from the set of co-located satellites, the forward link signal components based at least in part on the received respective representations of the forward link signal components.

Aspect 7: The apparatus of any of aspects 1 through 6 where each satellite of the set of co-located satellites includes a plurality of elements and a local processor and the method, apparatuses, and non-transitory computer-readable medium, further includes operations, features, circuitry, logic, means, or instructions, or any combination thereof for performing, at the local processor, beamforming of a plurality of local component signals received at the plurality of elements to obtain the respective signal component.

Aspect 8: The apparatus of aspect 7, further including operations, features, circuitry, logic, means, or instructions, or any combination thereof for obtaining, at the local processor of each satellite of the set of co-located satellites, a first representation of the respective signal component corresponding to a respective first local beam associated with a first local coverage area from the plurality of local component signals received at the plurality of elements and obtaining, at the local processor of each satellite of the set of co-located satellites, a second representation of a respective signal component corresponding to a respective second local beam associated with a second local coverage area from the plurality of local component signals received at the plurality of elements, where the respective first local beam and the respective second local beam are associated with at least partially overlapping frequency ranges.

Aspect 9: The apparatus of aspect 8, further including operations, features, circuitry, logic, means, or instructions, or any combination thereof for obtaining, at the central processor, a first beam signal based at least on applying a first set of beamforming coefficients to the first representations obtained by each of the set of co-located satellites and obtaining, at the central processor, a second beam signal based at least on applying a second set of beamforming coefficients to the second representations obtained by each of the set of co-located satellites.

Aspect 10: The apparatus of any of aspects 1 through 9, further including operations, features, circuitry, logic, means, or instructions, or any combination thereof for collecting, at a central satellite, the respective representation of the respective return link signal component for each satellite of the set of co-located satellites, where the central satellite transmits the respective representation of the respective return link signal component for each satellite of the set of co-located satellites to the one or more ground stations.

Aspect 11: The apparatus of aspect 10, further including operations, features, circuitry, logic, means, or instructions, or any combination thereof for receiving, at the central satellite and a from a first satellite of the set of co-located satellites, a first representation of a first return link signal component and receiving, at the central satellite and from a second satellite of the set of co-located satellites, a second representation of a second return link signal component based at least in part on receiving the first representation of the first return link signal component at the first frequency range excluding a second frequency range over which the second representation of the second return link signal component is received.

Aspect 12: The apparatus of any of aspects 10 through 11, further including operations, features, circuitry, logic, means, or instructions, or any combination thereof for the central satellite includes one co-located satellite of the set of co-located satellites.

Aspect 13: The apparatus of any of aspects 1 through 12, further including operations, features, circuitry, logic, means, or instructions, or any combination thereof for identifying, at the central processor, a location of each satellite of the set of co-located satellites and generating, at the central processor, the set of beamforming coefficients based at least in part on the identified location.

Aspect 14: The apparatus of any of aspects 1 through 13 where the one or more ground stations includes a set of ground stations and the method, apparatuses, and non-transitory computer-readable medium, further includes operations, features, circuitry, logic, means, or instructions, or any combination thereof for forming, via a subset of the set of ground stations, a beam for receiving the representation of the respective return link signal component from one satellite of the set of co-located satellites.

Aspect 15: The apparatus of any of aspects 1 through 14, further including operations, features, circuitry, logic, means, or instructions, or any combination thereof for the inter-satellite spacing of adjacent satellites of the set of co-located satellites along the first dimension or a second dimension orthogonal to the first dimension is greater than a distance that is equivalent to a wavelength of the return link signal components.

Aspect 16: The apparatus of any of aspects 1 through 15, further including operations, features, circuitry, logic, means, or instructions, or any combination thereof for the inter-satellite spacing of adjacent satellites of the set of co-located satellites along the first dimension or a second dimension orthogonal to the first dimension is greater than a distance that is equivalent to ten times a wavelength of the return link signal components.

Aspect 17: The apparatus of any of aspects 1 through 16, further including operations, features, circuitry, logic, means, or instructions, or any combination thereof for applying, at the central processor, the set of beamforming coefficients to the representations of the respective return link signal components to obtain the one or more return link beam signals at a first time and applying, at a local processor on one of the set of co-located satellites, a second set of beamforming coefficients to at least a subset of the representations of the respective return link signal components to obtain one or more second return link beam signals at a second time.

Figure 9:
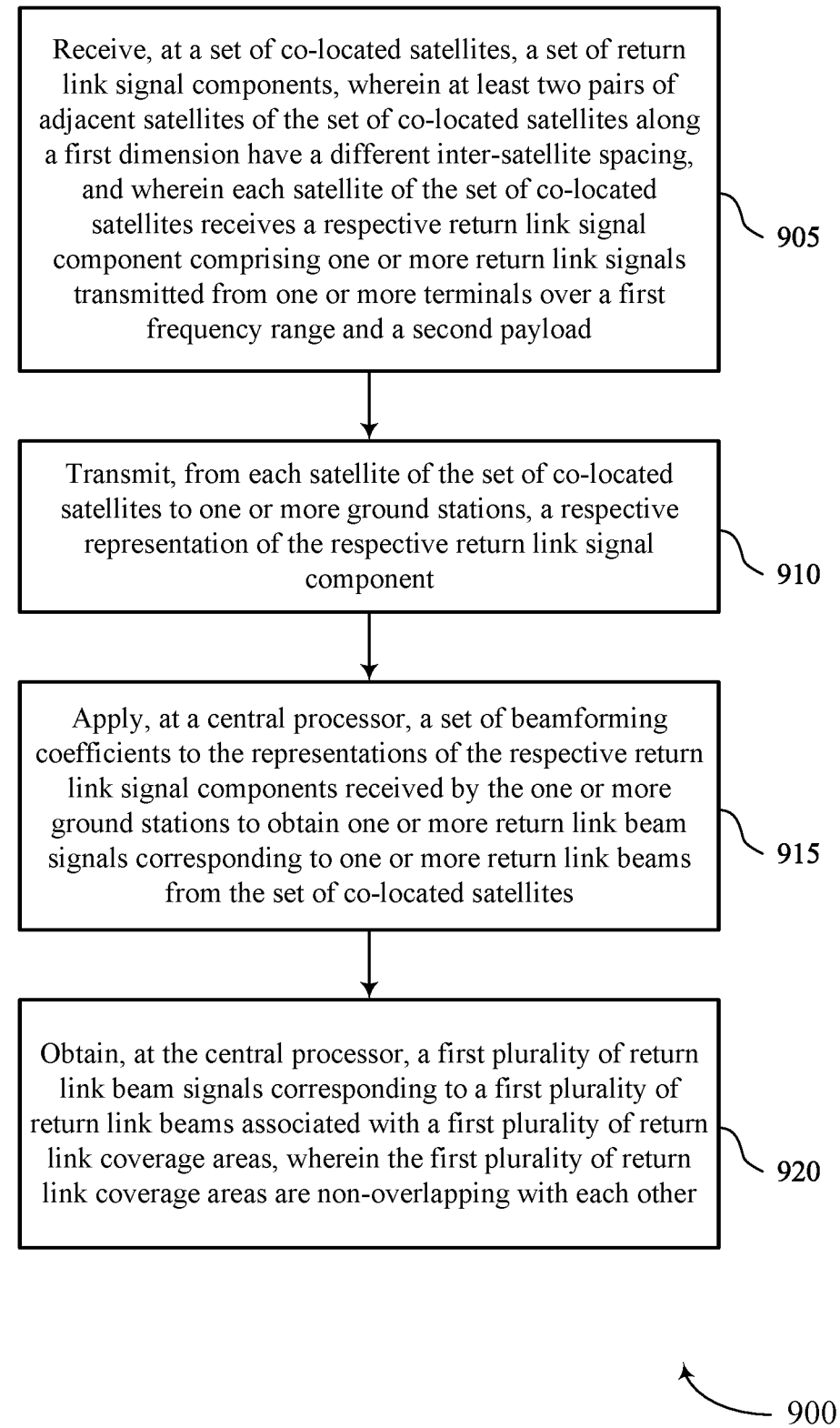

FIG. 9 shows a flowchart illustrating a method 900 that supports co-located satellites with ground based processing in accordance with examples as disclosed herein. The operations of method 900 may be implemented by or its components as described herein. For example, the operations of method 900 may be performed by. In some examples, may execute a set of instructions to control the functional elements of the device to perform the described functions. Additionally or alternatively, may perform aspects of the described functions using special-purpose hardware.

At 905, the method may include receiving, at a set of co-located satellites, a set of return link signal components, where at least two pairs of adjacent satellites of the set of co-located satellites along a first dimension have a different inter-satellite spacing, and where each satellite of the set of co-located satellites receives a respective return link signal component including one or more return link signals transmitted from one or more terminals over a first frequency range and a second payload. The operations of 905 may be performed in accordance with examples as disclosed herein.

At 910, the method may include transmitting, from each satellite of the set of co-located satellites to one or more ground stations, a respective representation of the respective return link signal component. The operations of 910 may be performed in accordance with examples as disclosed herein.

At 915, the method may include applying, at a central processor, a set of beamforming coefficients to the representations of the respective return link signal components received by the one or more ground stations to obtain one or more return link beam signals corresponding to one or more return link beams from the set of co-located satellites. The operations of 915 may be performed in accordance with examples as disclosed herein.

At 920, the method may include obtaining, at the central processor, a first plurality of return link beam signals corresponding to a first plurality of return link beams associated with a first plurality of return link coverage areas, where the first plurality of return link coverage areas are non-overlapping with each other. The operations of 920 may be performed in accordance with examples as disclosed herein.

Figure 10:
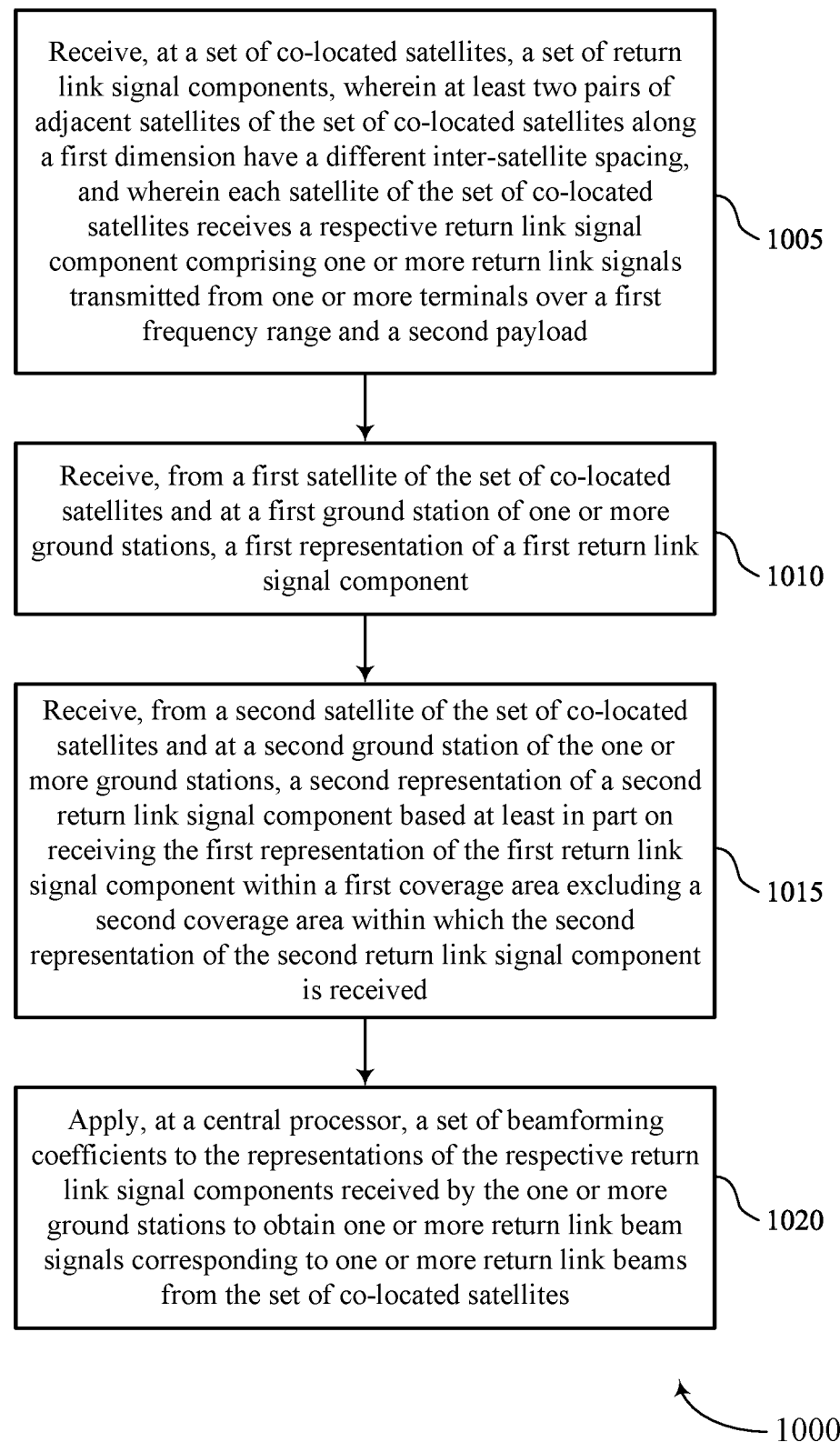

FIG. 10 shows a flowchart illustrating a method 1000 that supports co-located satellites with ground based processing in accordance with examples as disclosed herein. The operations of method 1000 may be implemented by or its components as described herein. For example, the operations of method 1000 may be performed by. In some examples, may execute a set of instructions to control the functional elements of the device to perform the described functions. Additionally or alternatively, may perform aspects of the described functions using special-purpose hardware.

At 1005, the method may include receiving, at a set of co-located satellites, a set of return link signal components, where at least two pairs of adjacent satellites of the set of co-located satellites along a first dimension have a different inter-satellite spacing, and where each satellite of the set of co-located satellites receives a respective return link signal component including one or more return link signals transmitted from one or more terminals over a first frequency range and a second payload. The operations of 1005 may be performed in accordance with examples as disclosed herein.

At 1010, the method may include receiving, from a first satellite of the set of co-located satellites and at a first ground station of one or more ground stations, a first representation of a first return link signal component. The operations of 1010 may be performed in accordance with examples as disclosed herein.

At 1015, the method may include receiving, from a second satellite of the set of co-located satellites and at a second ground station of the one or more ground stations, a second representation of a second return link signal component based at least in part on receiving the first representation of the first return link signal component within a first coverage area excluding a second coverage area within which the second representation of the second return link signal component is received. The operations of 1015 may be performed in accordance with examples as disclosed herein.

At 1020, the method may include applying, at a central processor, a set of beamforming coefficients to the representations of the respective return link signal components received by the one or more ground stations to obtain one or more return link beam signals corresponding to one or more return link beams from the set of co-located satellites. The operations of 1020 may be performed in accordance with examples as disclosed herein.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 18: A system, including: a set of co-located satellites configured to collect a set of return link signal components, where at least two pairs of adjacent satellites of the set of co-located satellites along a first dimension have a different inter-satellite spacing, and where each satellite of the set of co-located satellites includes a first payload configured to receive a respective return link signal component including one or more return link signals transmitted from one or more terminals over a first frequency range and a second payload configured to transmit a representation of the respective return link signal component; one or more ground stations configured to receive the representations of the respective return link signal components; and a central processor configured to apply a set of beamforming coefficients to the representations of the respective return link signal components received by the one or more ground stations to obtain one or more return link beam signals corresponding to one or more return link beams from the set of co-located satellites.

Aspect 19: The system of aspect 18, where the central processor is configured to obtain a first plurality of return link beam signals corresponding to a first plurality of return link beams associated with a first plurality of return link coverage areas, the first plurality of return link coverage areas are non-overlapping with each other.

Aspect 20: The system of aspect 19, where the central processor is configured to obtain a second plurality of return link beam signals corresponding to a second plurality of return link beams associated with a second plurality of return link coverage areas, the second plurality of return link coverage areas are non-overlapping with each other, and the second plurality of return link beams are associated with one or more second return link signals transmitted from one or more second terminals over a second frequency range.

Aspect 21: The system of any of aspects 18 through 20, where a first ground station of the one or more ground stations is configured to receive a first representation of a first return link signal component from a first satellite of the set of co-located satellites and a second ground station is configured to receive a second representation of a second return link signal component from a second satellite of the set of co-located satellites based at least in part on the first satellite being configured to transmit the first representation of the first return link signal component within a first coverage area excluding a second coverage area to which the second satellite is configured to transmit the second representation of the second return link signal component.

Aspect 22: The system of any of aspects 18 through 21, where a ground station of the one or more ground stations is configured to receive a first representation of a first return link signal component from a first satellite of the set of co-located satellites and to receive a second representation of a second return link signal component from a second satellite of the set of co-located satellites based at least in part on the first satellite being configured to transmit the first representation of the first return link signal component at the first frequency range excluding a second frequency range over which the second satellite is configured to transmit the second representation of the second return link signal component.

Aspect 23: The system of any of aspects 18 through 22, where: the second payloads of the set of co-located satellites are configured to receive respective representations of forward link signal components; the first payloads of the set of co-located satellites are configured to transmit the forward link signal components based at least in part on the received respective representations of the forward link signal components; the central processor is configured to apply a set of forward link beamforming coefficients to one or more forward link beam signals to obtain the representations of the forward link signal components; and the one or more ground stations are configured to transmit the representations of the forward link signal components to the set of co-located satellites.

Aspect 24: The system of any of aspects 18 through 23, where the first payload of each satellite of the set of co-located satellites includes a plurality of elements and a local processor configured to perform beamforming of a plurality of local component signals received at the plurality of elements to obtain the respective signal component.

Aspect 25: The system of aspect 24, where the local processor of each satellite of the set of co-located satellites is configured to obtain a first representation of the respective signal component corresponding to a respective first local beam associated with a first local coverage area from the plurality of local component signals received at the plurality of elements and to obtain a second representation of a respective signal component corresponding to a respective second local beam associated with a second local coverage area from the plurality of local component signals received at the plurality of elements, and the respective first local beam and the respective second local beam are associated with at least partially overlapping frequency ranges.

Aspect 26: The system of aspect 25, where the central processor is configured to obtain a first beam signal based at least on applying a first set of beamforming coefficients to the first representations obtained by each of the set of co-located satellites and to obtain a second beam signal based at least on applying a second set of beamforming coefficients to the second representations obtained by each of the set of co-located satellites.

Aspect 27: The system of any of aspects 18 through 26, where the system further includes: a central satellite configured to collect the representations of the respective return link signal components and to transmit the representations to the one or more ground stations.

Aspect 28: The system of aspect 27, where the central satellite is configured to receive a first representation of a first return link signal component from a first satellite of the set of co-located satellites and to receive a second representation of a second return link signal component from a second satellite of the set of co-located satellites based at least in part on the first satellite being configured to transmit the first representation of the first return link signal component at a first range of frequencies excluding a second range of frequencies over which the second satellite is configured to transmit the second representation of the second return link signal component.

Aspect 29: The system of any of aspects 27 through 28, where the central satellite includes one co-located satellite of the set of co-located satellites.

Aspect 30: The system of any of aspects 18 through 29, where the central processor is configured to identify a location of each satellite of the set of co-located satellites and to generate the set of beamforming coefficients based at least in part on the identified location.

Aspect 31: The system of any of aspects 18 through 30, where the one or more ground stations includes a set of ground stations, a subset of the set of ground stations is configured to form a beam for receiving the representation of the respective return link signal component from one satellite of the set of co-located satellites.

Aspect 32: The system of any of aspects 18 through 31, where the inter-satellite spacing of adjacent satellites of the set of co-located satellites along the first dimension or a second dimension orthogonal to the first dimension is greater than a distance that is equivalent to a wavelength of the return link signal components.

Aspect 33: The system of any of aspects 18 through 32, where the inter-satellite spacing of adjacent satellites of the set of co-located satellites along the first dimension or a second dimension orthogonal to the first dimension is greater than a distance that is equivalent to ten times a wavelength of the return link signal components.

Aspect 34: The system of any of aspects 18 through 33, further including a local processor on one of the set of co-located satellites, where the central processor is configured to apply the set of beamforming coefficients to the representations of the respective return link signal components to obtain the one or more return link beam signals at a first time and the local processor is configured to apply a second set of beamforming coefficients to at least a subset of the representations of the respective return link signal components to obtain one or more second return link beam signals at a second time It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system, comprising:
a set of co-located satellites that orbit together around Earth, each satellite of the set of co-located satellites configured to receive a respective return link signal component of a return link signal transmitted from a terminal, wherein the each satellite of the set of co-located satellites comprises a first payload configured to receive the respective return link signal component over a first frequency range and a second payload configured to transmit a representation of the respective return link signal component;
one or more ground stations of a ground segment, the one or more ground stations configured to receive, from multiple satellites of the set of co-located satellites, the representations of the respective return link signal components of the return link signal transmitted from the terminal; and
a central processor included in the ground segment and configured to apply a set of beamforming coefficients to the representations of the respective return link signal components received by the one or more ground stations from the multiple satellites of the set of co-located satellites to obtain a first plurality of return link beam signals comprising a return link beam signal corresponding to the return link signal from the terminal, wherein the first plurality of return link beam signals corresponds to a first plurality of return link beams associated with a first plurality of return link coverage areas, wherein the first plurality of return link coverage areas are non-overlapping with each other, and wherein the return link beam signal corresponds to a return link beam of the first plurality of return link beams that is in a direction of the terminal.

2. The system of claim 1, wherein:
the central processor is configured to obtain a second plurality of return link beam signals corresponding to a second plurality of return link beams associated with a second plurality of return link coverage areas;
the second plurality of return link coverage areas are non-overlapping with each other; and
the second plurality of return link beams are associated with one or more second return link signals transmitted from one or more second terminals over a second frequency range.

3. The system of claim 1, wherein a first ground station of the one or more ground stations is configured to receive a first representation of a first return link signal component from a first satellite of the set of co-located satellites and a second ground station is configured to receive a second representation of a second return link signal component from a second satellite of the set of co-located satellites based at least in part on the first satellite being configured to transmit the first representation of the first return link signal component within a first coverage area excluding a second coverage area to which the second satellite is configured to transmit the second representation of the second return link signal component.

4. The system of claim 1, wherein a ground station of the one or more ground stations is configured to receive a first representation of a first return link signal component from a first satellite of the set of co-located satellites and to receive a second representation of a second return link signal component from a second satellite of the set of co-located satellites based at least in part on the first satellite being configured to transmit the first representation of the first return link signal component at the first frequency range excluding a second frequency range over which the second satellite is configured to transmit the second representation of the second return link signal component.

5. The system of claim 1, wherein:
the second payloads of the set of co-located satellites are configured to receive respective representations of forward link signal components;
the first payloads of the set of co-located satellites are configured to transmit the forward link signal components based at least in part on the received respective representations of the forward link signal components;
the central processor is configured to apply a set of forward link beamforming coefficients to one or more forward link beam signals to obtain the representations of the forward link signal components; and
the one or more ground stations are configured to transmit the representations of the forward link signal components to the set of co-located satellites.

6. The system of claim 1, wherein the first payload of each satellite of the set of co-located satellites comprises a plurality of elements and a local processor configured to perform beamforming of a plurality of local component signals received at the plurality of elements to obtain the respective signal component.

7. The system of claim 6, wherein:
the local processor of each satellite of the set of co-located satellites is configured to obtain a first representation of the respective signal component corresponding to a respective first local beam associated with a first local coverage area from the plurality of local component signals received at the plurality of elements and to obtain a second representation of a respective signal component corresponding to a respective second local beam associated with a second local coverage area from the plurality of local component signals received at the plurality of elements; and
the respective first local beam and the respective second local beam are associated with at least partially overlapping frequency ranges.

8. The system of claim 7, wherein the central processor is configured to obtain a first beam signal based at least on applying a first set of beamforming coefficients to the first representations obtained by each of the set of co-located satellites and to obtain a second beam signal based at least on applying a second set of beamforming coefficients to the second representations obtained by each of the set of co-located satellites.

9. The system of claim 1, wherein the system further comprises:
a central satellite configured to collect the representations of the respective return link signal components and to transmit the representations to the one or more ground stations.

10. The system of claim 9, wherein the central satellite is configured to receive a first representation of a first return link signal component from a first satellite of the set of co-located satellites and to receive a second representation of a second return link signal component from a second satellite of the set of co-located satellites based at least in part on the first satellite being configured to transmit the first representation of the first return link signal component at a first range of frequencies excluding a second range of frequencies over which the second satellite is configured to transmit the second representation of the second return link signal component.

11. The system of claim 9, wherein the central satellite comprises one co-located satellite of the set of co-located satellites.

12. The system of claim 1, further comprising:
a local processor on one of the set of co-located satellites, wherein the central processor is configured to apply the set of beamforming coefficients to the representations of the respective return link signal components to obtain the return link beam at a first time and the local processor is configured to apply a second set of beamforming coefficients to at least a subset of the representations of the respective return link signal components to obtain a second return link beam at a second time.

13. The system of claim 1, wherein the central processor is configured to identify a location of each satellite of the set of co-located satellites and to generate the set of beamforming coefficients based at least in part on the identified location.

14. The system of claim 1, wherein:
the one or more ground stations comprises a set of ground stations; and
a subset of the set of ground stations is configured to form the beam for receiving the representation of the respective return link signal component from one satellite of the set of co-located satellites.

15. The system of claim 1, wherein an inter-satellite spacing of adjacent satellites of the set of co-located satellites along a first dimension or a second dimension orthogonal to the first dimension is greater than a distance that is equivalent to a wavelength of the return link signal components.

16. The system of claim 1, wherein an inter-satellite spacing of adjacent satellites of the set of co-located satellites along a first dimension or a second dimension orthogonal to the first dimension is greater than a distance that is equivalent to ten times a wavelength of the return link signal components.

* * * * *